United States Patent

[11] 3,594,734

[72] Inventors An Wang
Lincoln, Mass.;
Prentice I. Robinson, Hudson, N.H.
[21] Appl. No. 809,251
[22] Filed Mar. 21, 1969
[45] Patented July 20, 1971
[73] Assignee Wang Laboratories, Inc.
Tewksbury, Mass.

[54] PROGRAMMABLE CALCULATOR
15 Claims, 14 Drawing Figs.

[52] U.S. Cl. .......... 340/172.5, 235/61.11 D
[51] Int. Cl. .......... G06f 3/06, G06f 3/10
[50] Field of Search .......... 340/172.5; 235/157

[56] References Cited

UNITED STATES PATENTS

| | | | |
|---|---|---|---|
| 3,380,031 | 4/1968 | Clayton et al. | 340/172.5 |
| 3,403,225 | 9/1968 | Mislan et al | 340/172.5 X |
| 3,495,222 | 2/1970 | Perotto et al. | 340/172.5 |

*Primary Examiner*—Raulfe B. Zache
*Attorney*—Martin Kirkpatrick

ABSTRACT: An electronic calculator system includes a keyboard unit having keys representing numerical values from 0 through 9 and additional keys representing instruction values. Logic responsive to key operation produces codes for numerical values and instruction values; these codes function to determine operations performed by the calculator. The system further includes a magnetic tape unit operable in either of two modes: a learn mode in which key actuation causes the codes to be recorded in predetermined sequence upon a loop of magnetic tape, and a normal mode in which the tape unit senses the codes upon the tape and produces signals responsive to the codes to control calculator operation.

PROGRAMMABLE CALCULATOR

This invention relates to an electronic calculator system including a magnetic tape unit which permits the "learning" of sequences of keyboard operation.

Calculators (devices without large capacity storage) have the ability to perform many of the complex mathematical manipulations of which large general purpose computers are capable, but typically they do not have the ability to perform, automatically, a series of instructions in the nature of a program. Copending application Ser. No. 782,021, filed Dec. 9, 1968, and assigned to the same assignee as the present application, describes one method of adapting a calculator to perform a program of operations under control of punched cards. The cards used must, however, be carefully and slowly prepunched with a program, and any errors introduced require the punching of an entire fresh card.

The calculator system described herein includes all the programming capabilities of the prior system, and in addition permits the programming to be done directly from the calculator keyboard by operation of data and instruction keys. When operated in the learn mode, the calculator records on a loop of magnetic tape codes corresponding to the keys operated. When operated in normal mode, the calculator automatically responds to the codes upon the tape and duplicates the operations that would be initiated by actuation of the corresponding keys. The program keyed onto the tape may be conveniently displayed by the calculator display panel, and errors can be corrected by keying corrected data or instructions over that erroneously keyed in.

Accordingly it is an object of the present invention to provide novel calculator systems with simple and relatively inexpensive magnetic tape storage for data and instruction codes.

Another object of the invention is to provide such a calculator system which can perform a series of instructions, in the nature of a program, automatically and without the need for large internal storage capacity, which instructions contain an operation portion, but no operand-address portion.

A further object of the invention is to provide such a system wherein the program can be simply and naturally written upon magnetic tape by the same operations of the keyboard which would be used to perform the program manually, while providing a convenient check of the program recorded through visual display.

A further object of the invention is to provide such a system which can, upon the basis of results of a calculator operation, select a nonsuccessive instruction in a preestablished series of instructions.

A further object of the invention is to provide such a system which can, in response to an instruction, branch to a selected subroutine and upon completion of the subroutine return to the instruction following the branch point.

Features of the invention include the concept of a calculator system having a basic calculator unit with a keyboard for entering numerical and instruction codes and a tape unit for storing such codes in predetermined sequence and for recovering said codes from said tape in sequence determined in part by the codes recovered and for applying signals governed by the codes to the basic calculator unit. The basic calculator unit may be operated manually and independently of the tape unit or automatically under the control of the taped program.

In the preferred embodiment the magnetic tape is in the form of a closed loop and includes an indicator adapted to be sensed by the tape unit as a reference point upon the tape. Codes are recorded serially upon the tape, each code comprising in sequence a leading framing bit, a 6 bit code, and a trailing framing bit. Each bit is recorded as two changes of state in tape magnetization, the bit value being determined by the spacing between the two changes. The tape loop is enclosed in a cartridge having an opening across which the tape may be drawn for reading or writing by the tape heads. The cartridges are readily insertable into and removable from the tape unit to permit convenient changing of programs.

Other objects, features, and advantages will appear from the following description of a preferred embodiment of the invention taken together with the attached drawings thereof, in which:

FIGS. 4 through 14 are logic drawings of the tape unit control, in which:

FIG. 4 shows the clock;

FIG. 5 shows the input buffer register;

FIG. 6 shows the shift and read-write logic;

FIG. 7 shows the erase logic;

FIG. 8 shows the display logic;

FIG. 9 shows the search-return logic;

FIG. 10 shows the control flip-flops;

FIG. 11 shows the external command logic;

FIG. 12 shows the single-step control;

FIGS. 13 and 14 show the control logic diode nets.

Figure 1:
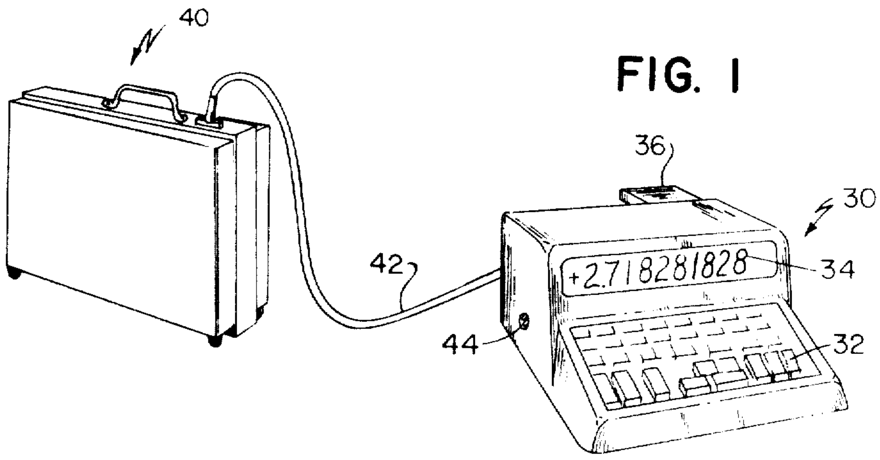
FIG. 1 is a perspective view of the calculator system.

There is shown in FIG. 1 a keyboard unit 30, having a keyboard 32 and a display 34 and interconnected to an electronics package 40 through a cable 42. The tape unit and its control logic are also included within the keyboard unit 30; a portion of a tape cartridge is shown at 36. Through plug 44 the basic calculator system can be connected to a variety of optional peripheral equipment (output writers, added storage capacity etc.).

Figure 2:
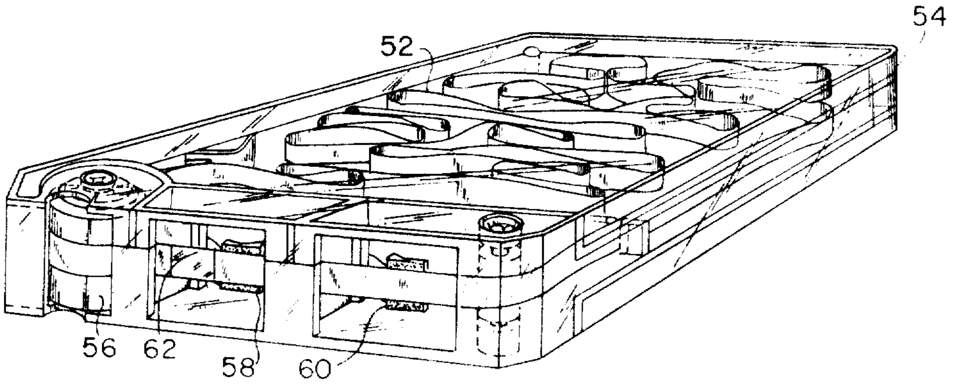
FIG. 2 is a perspective view of a tape cartridge.

FIG. 2 shows the tape cartridge 36 in greater detail. A serpentine loop of tape 52 is confined within transparent plastic cartridge case 54. The tape passes over pressure roller 56 which is driven by a capstan within the keyboard unit when the cartridge is inserted and the tape drive energized. The tape is pinched between roller 56 and the capstan. A solenoid-actuated clutch causes the capstan to rotate, drawing the tape across pressure pads 58 and 60, which when the cartridge is in place bias the tape against the tape unit read and write heads. A reflective strip 62 is secured to the outer surface of the tape loop (preferably at the splice point of the tape). This strip is sensed by the tape unit to determine an initial point on the tape.

Figure 3:
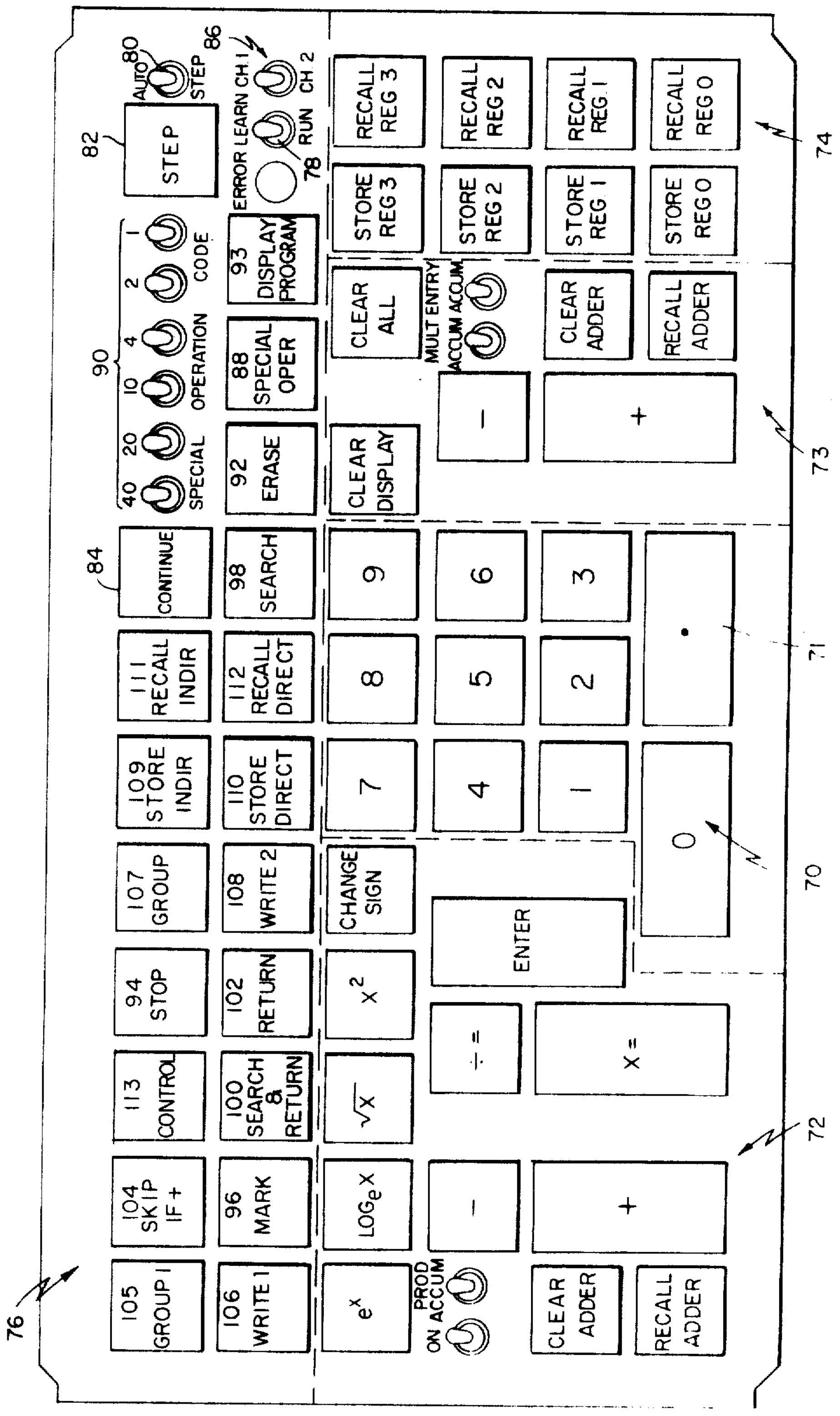
FIG. 3 is a diagrammatic view of the calculator keyboard.

The keyboard 32, shown in FIG. 3, includes a set of ten numerical keys 70; a decimal point key 71; two groups of arithmetic operation control keys 72, 73; a set of eight storage register control keys 74; and a remaining set of keys and controls 76 primarily related to programming and control of the tape unit (and other peripheral equipment).

The LEARN-RUN switch 78 determines whether the tape unit is to write codes upon the tape (LEARN), or to read codes from the tape (RUN). The AUTO-STEP switch 80 determines whether the tape is to be read continuously, or in a single-step mode. When the AUTO-STEP switch is set to AUTO, and the CONTINUE key 84 is operated, the tape is read until reaching a stop code. When the AUTO-STEP switch is set to STEP, one code only is read each time the STEP key 82 is actuated. The channel switch 86 determines which of the two tape channels is to be written upon or read from. The SPECIAL OPERATION key 88 is used in conjunction with switches 90 to key in any selected 6-bit code. The ERASE key 92 causes the entire tape to be erased. The DISPLAY PROGRAM key 93 causes the codes read from the tape to be displayed at display 34. The STOP key 94 writes a stop code upon the tape during LEARN mode operation. The MARK key 96 writes a mark code upon the tape.

The SEARCH key 98 writes a search code, (used to initate a branch in the program that searches for a specified mark code). The SEARCH AND RETURN key 100 produces a code that initiates a subroutine branch (with a return to the following code in sequence at the completion of the subroutine). The RETURN key 102 is used to mark the end of a subroutine. The SKIP IF + key marks a decision point (sign test) at which two codes are skipped if the calculator work register contents are positive. The remaining keys 105—113 are used for control commands relating to the optional peripheral equipment. In general, the codes they produce cause data to be sent to or received from specified peripheral equipments or cause control to be surrendered to such equipments by the calculator.

Some of the 6-bit codes generated by actuation of the keyboard are listed below in octal form. The following program codes are used extensively in the logic shown in FIGS. 4 through 14.

TABLE I—PROGRAM CODES

| Code | Command |
|---|---|
| 01 | Stop |
| 02 | Search |
| 03 | Search Return |
| 04 | Return |
| 05 | Sign Test |
| 06 | Continue |
| 07 | Mark |
| 20 | Overflow Test (Special Ta Tf Op.) |
| 30 | Zero Test (Special Op.) |

The remaining codes listed below are used only to initiate communication with optional peripheral equipment.

TABLE II—I/O Commands

| | |
|---|---|
| 21 | Control (Special Op.) |
| 24 | Write 1 |
| 25 | Write 2 |
| 26 | Store Direct |
| 27 | Recall Direct |
| 32 | Store Indirect |
| 33 | Recall Indirect |
| 36 | Group 1 |
| 37 | Group 2 |

Figure 4:
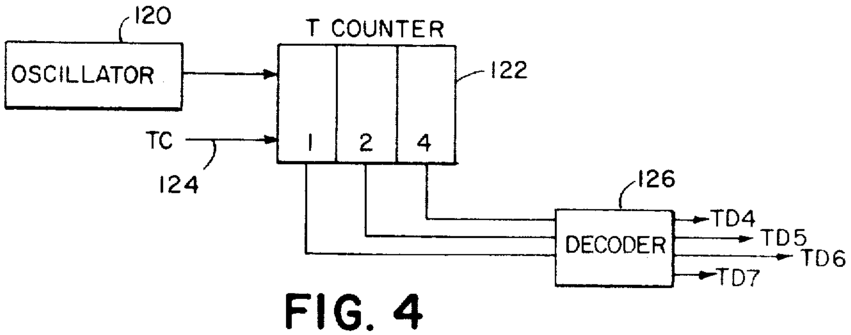

The tape unit clock is shown in FIG. 4. Oscillator 120 steps the 3-bit T counter 122 at 4 KHz. rate through one full eight-count cycle whenever a TC clock-enable signal is applied to the counter at 124. Decoder 126 responds to the counter contents to produce four sequenced clock pulses TD4, TD5, TD6 and TD7.

Figure 5:
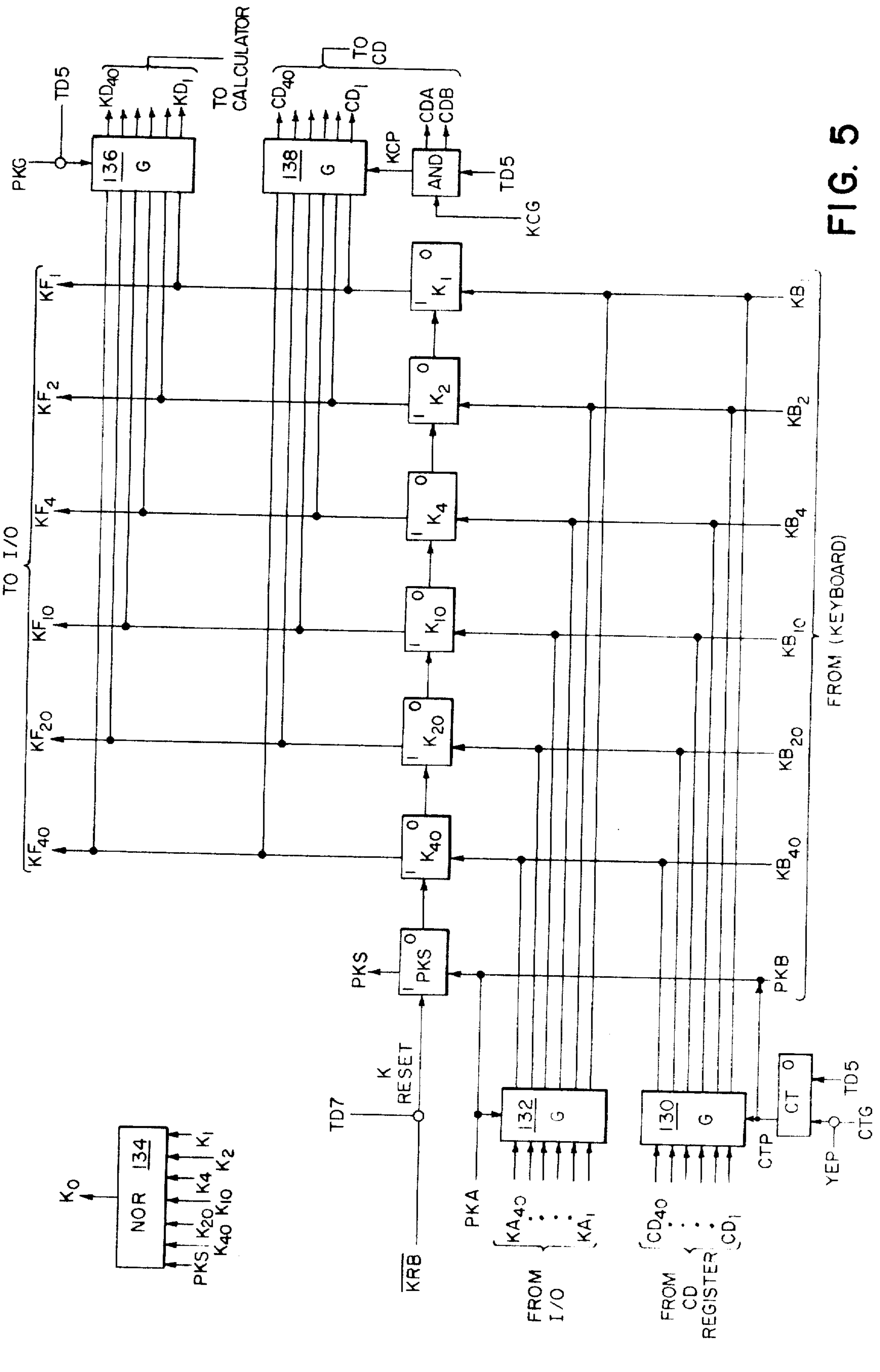

FIG. 5 shows the input buffer register (K register). This register consists of six code-receiving flip-flops $K_{40}$—$K_1$ and a code-present flip-flop PKS which is set whenever any code, even all 0s, is loaded into $K_{40}$—$K_1$. Operation of the keyboard produces signals on inputs $KB_{40}$—$KB_1$ thereby setting K to the code produced by the key actuated. Every key produces a PKB signal which sets the PKS flip-flop to indicate a code present. A second source of input data to K is the CD shift register (which receives incoming codes as they are read from the tape). The transfer from CD into K is initiated by setting the CT flip-flop. The set of CT produces a CTP signal, enabling gate 130, and thus permitting the six CD register outputs $CD_{40}$—$CD_1$ to determine the states of $K_{40}$—$K_1$. The code-present flip-flop PKS is automatically set by CTP. The CTP pulse also resets the CD shift register (see FIG. 6). The CT flip-flop is allowed to be set by the assertion of the CTG signal. The actual set of CT occurs at the YEP pulse (synchronized to the calculator display scan). The third and final source of input data to the K register is the optional peripheral (I/O) equipment. The PKA pulse causes gate 132 to pass signals $KA_{40}$—$KA_1$, enabling these signals to determine the states of $K_{40}$—$K_1$. The PKA pulse also sets PKS, indicating that some code has been loaded into K. NOR gate 134 generates the $K_0$ signal when K is empty. The K register is ordinarily reset at TD7, but this reset is inhibited when KRB is asserted.

When PKG is asserted, gate 136 at TD5 applies the K register outputs to the calculator as $KD_{40}$—$KD_1$. The K register outputs are made available for sampling by the optional peripheral (I/O) equipment at $KF_{40}$—$KF_1$. The contents of the K register are transferred into the CD shift register prior to being written on tape during learn mode operation. This transfer is gated by KCG, which together with TD5 produces KCP and sets CDA and CDB, the leading and trailing framing bits of the CD shift register. The 6-bit code in K is gated through gate 138 by KCP and transferred to the six central CD shift register stages as $CD_{40}$—$CD_1$.

Figure 6:
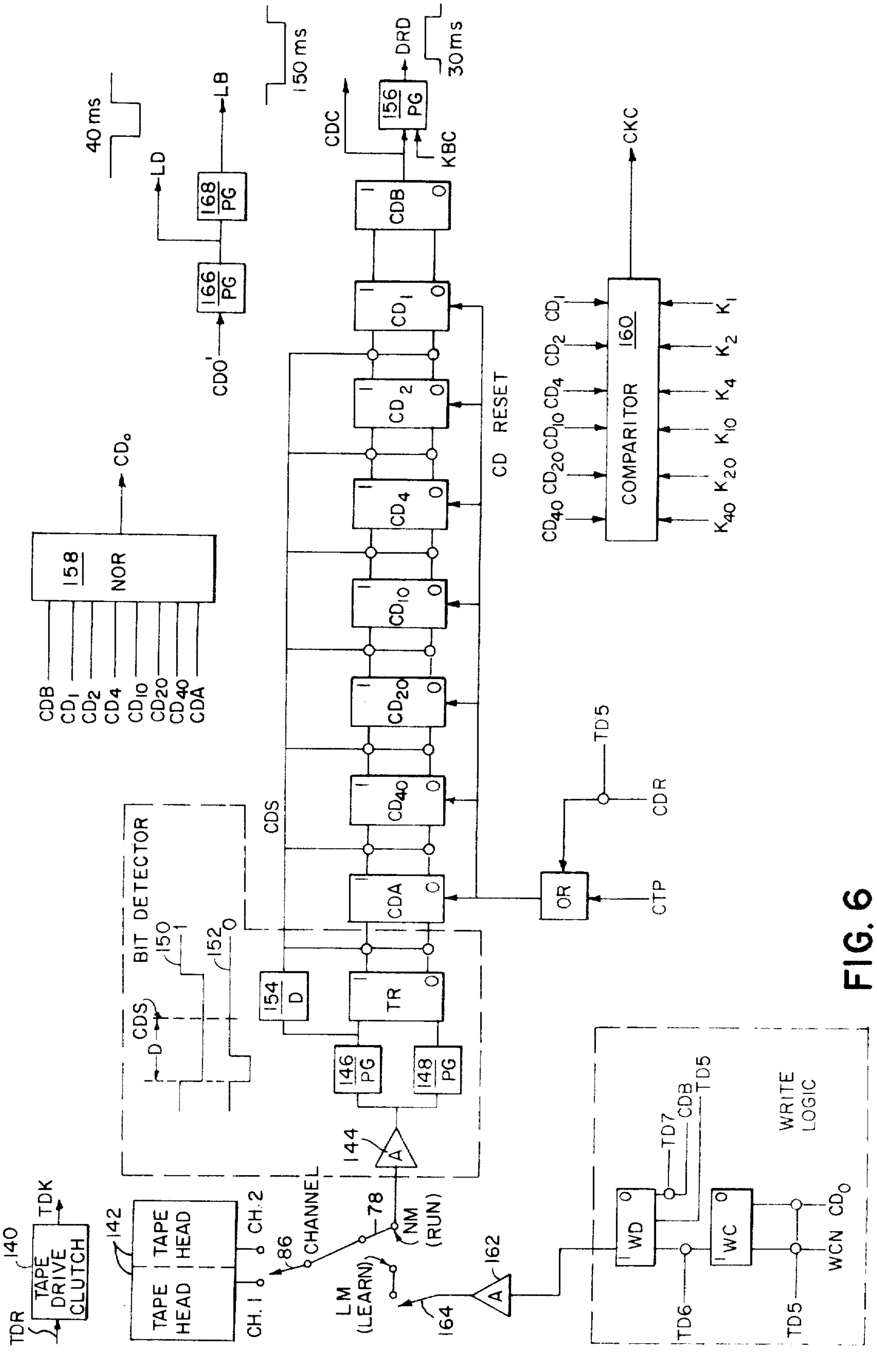

The CD shift register and associated read-write logic is shown in FIG. 6. The TDR signal causes the tape drive clutch to be engaged advancing the tape; TDK is logically equivalent to TDR and is used to indicate that the tape is being driven. Channel switch 86 determines which of the tape heads 142 is to be used (and hence which channel is to be written upon or read from). LEARN-RUN switch 78 determines whether the tape unit is to operate in learn mode (writing upon tape) or in normal mode (reading from the tape). In normal mode, the output signal from the selected tape head is applied through amplifier 144 to pulse generators 146 and 148. The leading edge of each bit triggers pulse generator 146, causing sampling flip-flop TR to be set. The trailing edge of each bit triggers pulse generator 148, resetting the TR flip-flop. The waveforms of 1 and 0 bits are shown at 150 and 152 respectively. Delay 154 is chosen so as to be intermediate between the duration of 1 and 0 bits; that is the delay is initiated by the leading edge of each bit; the expiration of the delay produces a CDS pulse that samples the contents of TR into CDA and shifts the entire CD register right 1 bit. For a 1 bit, TR is still in the 1 state at the sample time, but for a 0 bit, TR has already been reset at the expiration of the delay. The leading guard bit of each code sets CDB when the code has been entirely read in thus producing a CDC indication. KBC is a keyboard busy indication from the calculator. The DRD pulse is a 30 ms. pulse following the change in state of CDB. It is used to prevent premature engagement of the clutch 140 (while the clutch is still releasing from a previous drive).

The CD register is reset by the same CTP pulse that transfers the contents of CD into the K register buffer. Furthermore, CD is also reset by the CDR signal clocked by TD5. Nor circuit 158 causes $CD_0$ to be asserted when there is no code in CD. The negation, $CD_0'$, is asserted as soon as any code is transferred into CD. During learn mode, a 40 ms. LD pulse is produced by pulse generator 166 to give the tape time to come up to speed before writing is allowed to begin. The 150 ms. LB busy signal produced by pulse generator 168 prevents loading another code until the given write operation is completed. Comparitor 160 compares the contents of CD and K and when the two registers contain the same code produces a CKC output signal.

The WC and WD flip-flops are used during writing. The write operation is initiated by the assertion of WCN, which causes WC to be set at TD5 (consistently throughout the Figures a signal ending in "N" enables the associated flip-flop to be set, while a signal ending in "F" enables the reset). The TD6 clock next sets WD, producing the leading edge of a bit. The timing of the trailing edge is governed by the state of CDB, the leading framing stage of the CD shift register; each bit is shifted into CDB to be written on tape. If CDB contains 0, then TD7 resets WD producing a trailing edge closely following the TD6 leading edge, and thereby writing a 0 bit on the tape. However, if CDB contains 1, TD7 is not allowed to reset WD, and the reset is deferred until the following TD5, thereby producing a trailing edge more widely spaced from TD6 and writing a 1 bit on the tape. The output from the WD flip-flop is applied to the selected tape head through amplifier 162, data-protection switch 164, LEARN-RUN switch 78, and channel switch 86. Naturally, writing can only occur when switch 78 is set to LM (LEARN MODE). Data-protection switch 164 can be held open (preventing writing) by adding a simple interlock to the tape cartridge.

Figure 7:
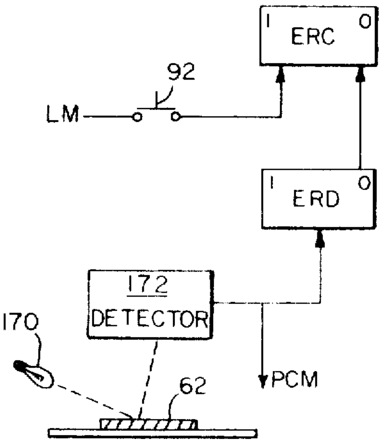

The erase control circuitry is shown in FIG. 7. Operating the ERASE key 92 when in learn mode sets the ERC flip-flop. The set of ERC turns on the tape drive, disables the keyboard, and turns on an indicator light. A light source 170 is positioned to be reflected to detector 172 when the reflective strip 62 upon the tape reaches a particular predetermined position. The detector then produces a PCM pulse indicating that the reflective strip has been sensed. The PCM pulse sets the ERD flip-flop. The tape is then driven through a complete cycle until the reflective strip 62 is again sensed and a second PCM pulse is produced. This pulse resets ERD, and the reset of ERD resets ERC turning off the tape drive and ending the erase cycle. This logic ensures that every point on the tape is erased at least once, whatever the position of the tape happened to be at the time the erase signal was given.

Figure 8:
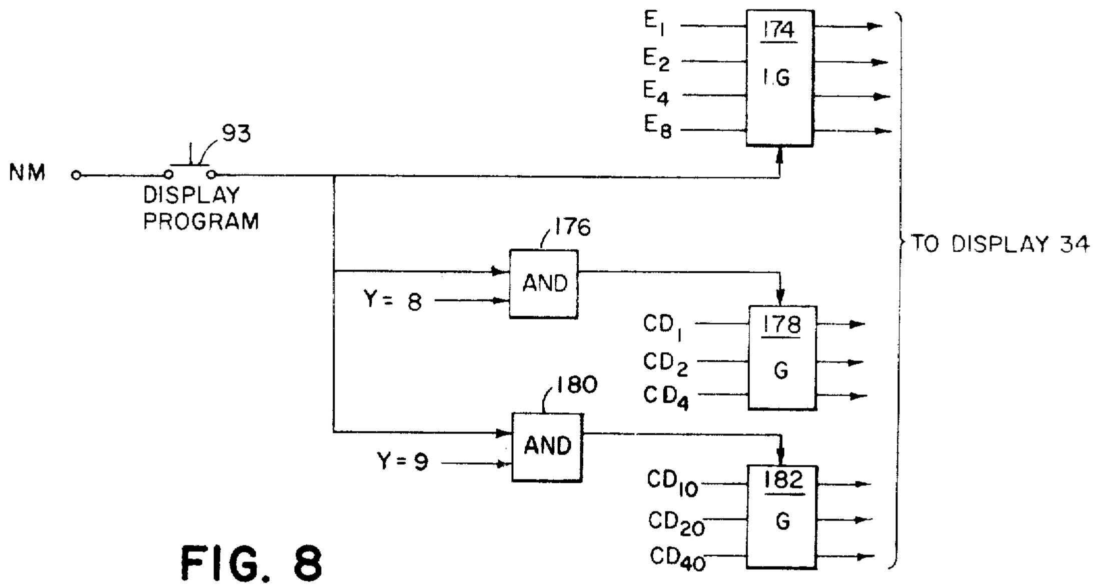

The display circuitry is shown in FIG. 8. Normally the calculator provides the input $E_1$—$E_4$ which determines the specific decimal digit to be displayed at 34. However, when the DISPLAY PROGRAM key 93 is actuated during normal mode operation, inhibit gate 174 prevents the calculator input from being displayed. When the display position scan (Y scan) corresponds to digit position 8, AND gate 176 enables gate 178 to apply the three low-order bits of the CD shift register to the display; these bits are then displayed as an octal digit at display position 8. Similarly, AND gate 180 and gate 182 permit the display of the three high order bits of CD at display position 9.

Figure 9:
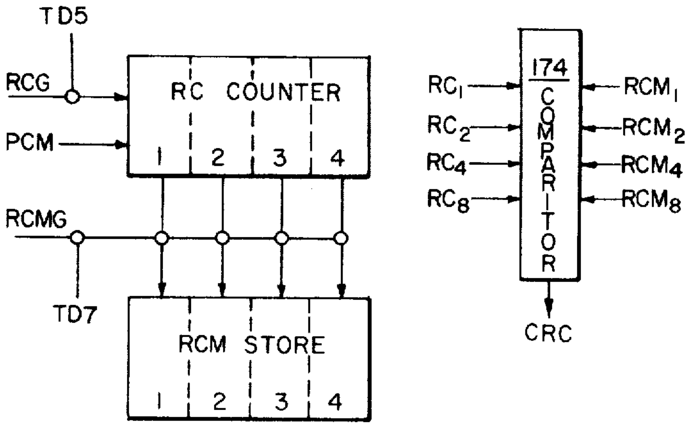

FIG. 9 shows the logic utilized for execution of the search return command. The tape unit resets the RC counter at PCM (when the index mark is sensed) and increments RC each time a search return instruction is encountered, thus keeping a running indication of the number of the current search return instruction from the index mark. Each search return instruction encountered produces an RCG signal, which, when clocked by TD5 steps the RC counter. During the execution of a given search return instruction, an RCMG signal is produced, causing the contents of RC to be stored in RCM. The program returns to the given search return instruction after executing a subroutine; RC is counted up until its contents match those of RCM. The comparison is made by comparitor 174, which produces a CRC signal when the comparison is effected.

Figures 10, 11, 12:
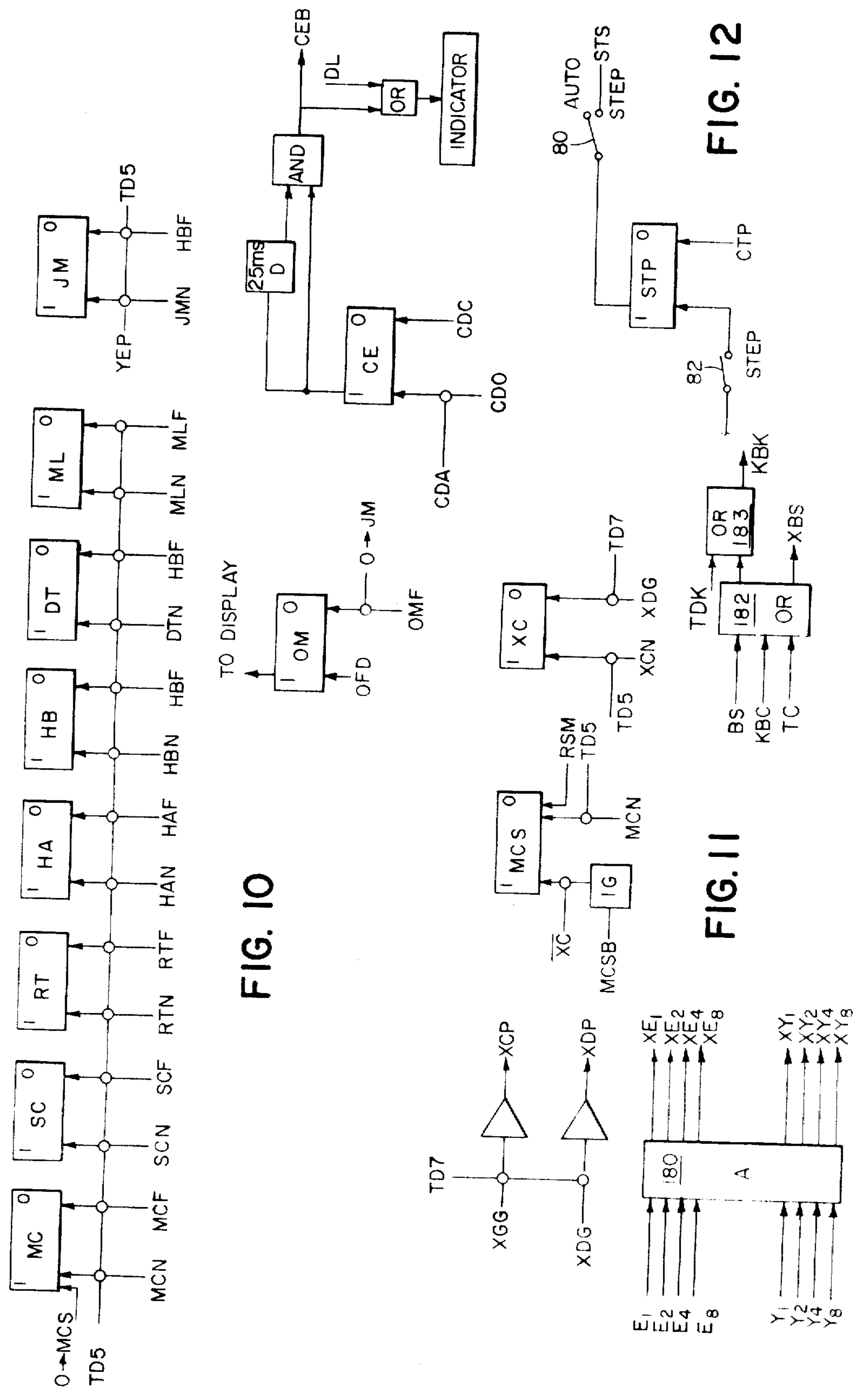

The control flip-flops are shown in FIG. 10. The MC flip-flop (Continue) is used during both normal mode and learn mode operation. The SC flip-flop (Search) controls the search instruction. The RT flip-flop (Return) controls the return after execution of a subroutine. The HA and HB flip-flops are condition memories. The DT flip-flop (Decision Test) is used during the three decision test instructions, sign test, zero test, and overflow test. The ML flip-flop is used during dual-code instructions, primarily as a means of indicating that the second code of the instruction is not to be interpreted an independent instruction. The JM flip-flop (Jump) is used when the decision test indicates that the next codes encountered are to be skipped. The OM flip-flop is set by an $OF_D$ signal from the calculator when an overflow occurs. The CE flip-flop is used for error detection. It is set when the leading framing bit is read into CDA, and reset when CDB flip-flop is set. If this does not occur within 25 ms., a CEB signal is produced indicating the occurrence of an error.

The external command logic shown in FIG. 11 is used in conjunction with the MC flip-flop to govern the transfer of control to optional peripheral equipment. The XC flip-flop is set by XCN when an external command is used. The MC flip-flop is reset and the MCS flip-flop is set during surrender of command to the external equipment. A resume pulse (RSM) from the external equipment is used to return control to the calculator. This resets MCS and sets MC. The XCP and XDP pulses are generated in succession to strobe out codes from K register outputs $KF_{48}$—$KF_1$ (see FIG. 5) to the external equipment. The calculator display data ($XE_1$—$XE_8$) and display scan position ($XY_1$--$XY_8$) are made available to the external equipment through amplifiers 180. Internally generated busy signal BS, the KBC busy signal from the calculator, and the TC clock (FIG. 14, 273) cause OR gates 182 and 183 to produce suitable output busy signals from the tape unit (OR gate 183 causes KBK to be asserted whenever the tape is driven because TDR produces TDK). The XBS signal is applied to the peripheral equipment, and the KBK temporarily disables the calculator keyboard.

Single-step control (shown in FIG. 12) permits the program on tape to be executed one code at a time. When the AUTO-STEP switch 80 is in STEP position, the program may be single-stepped by actuating the STEP key 82.

Figure 13:
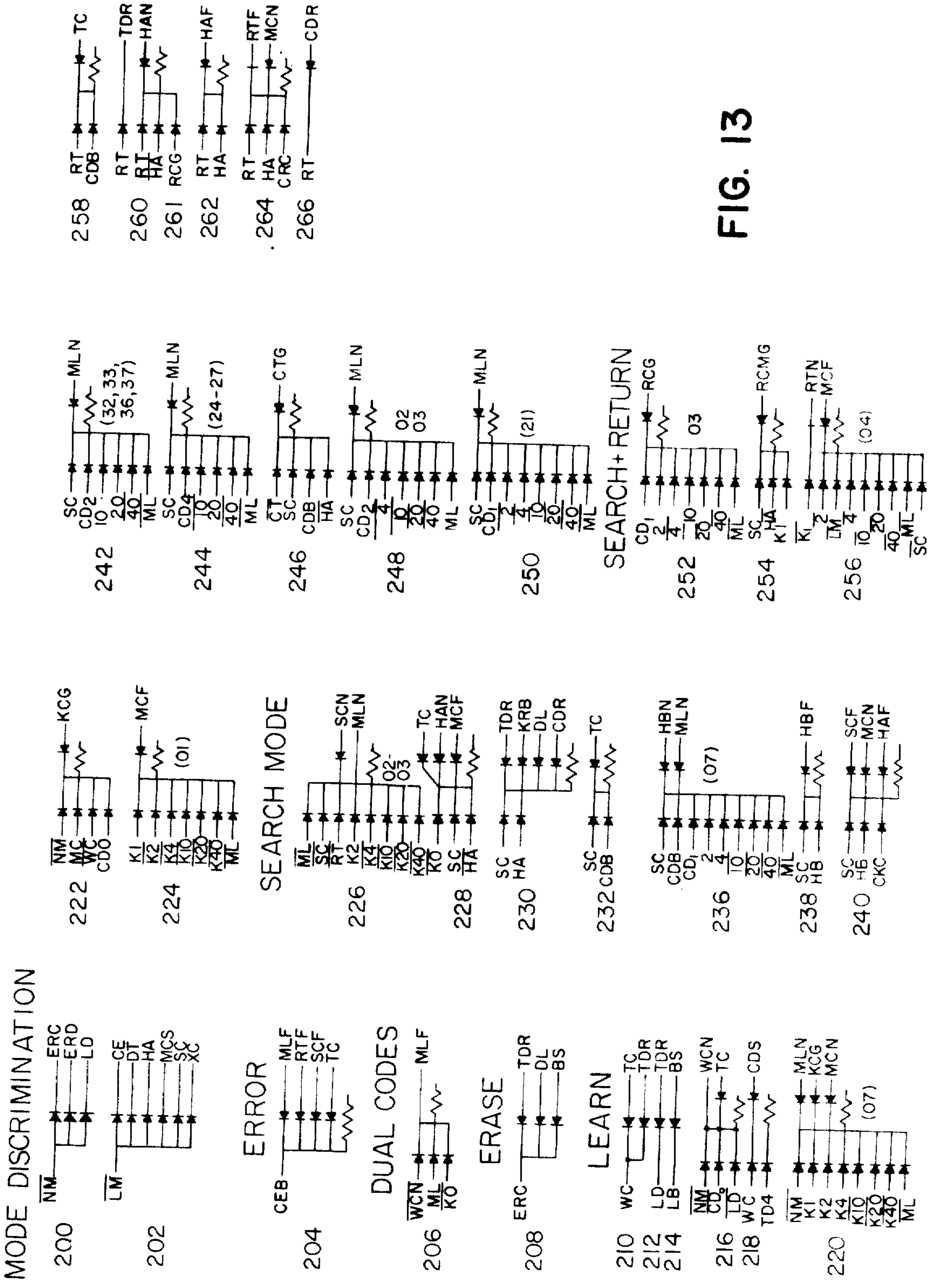
Figure 14:
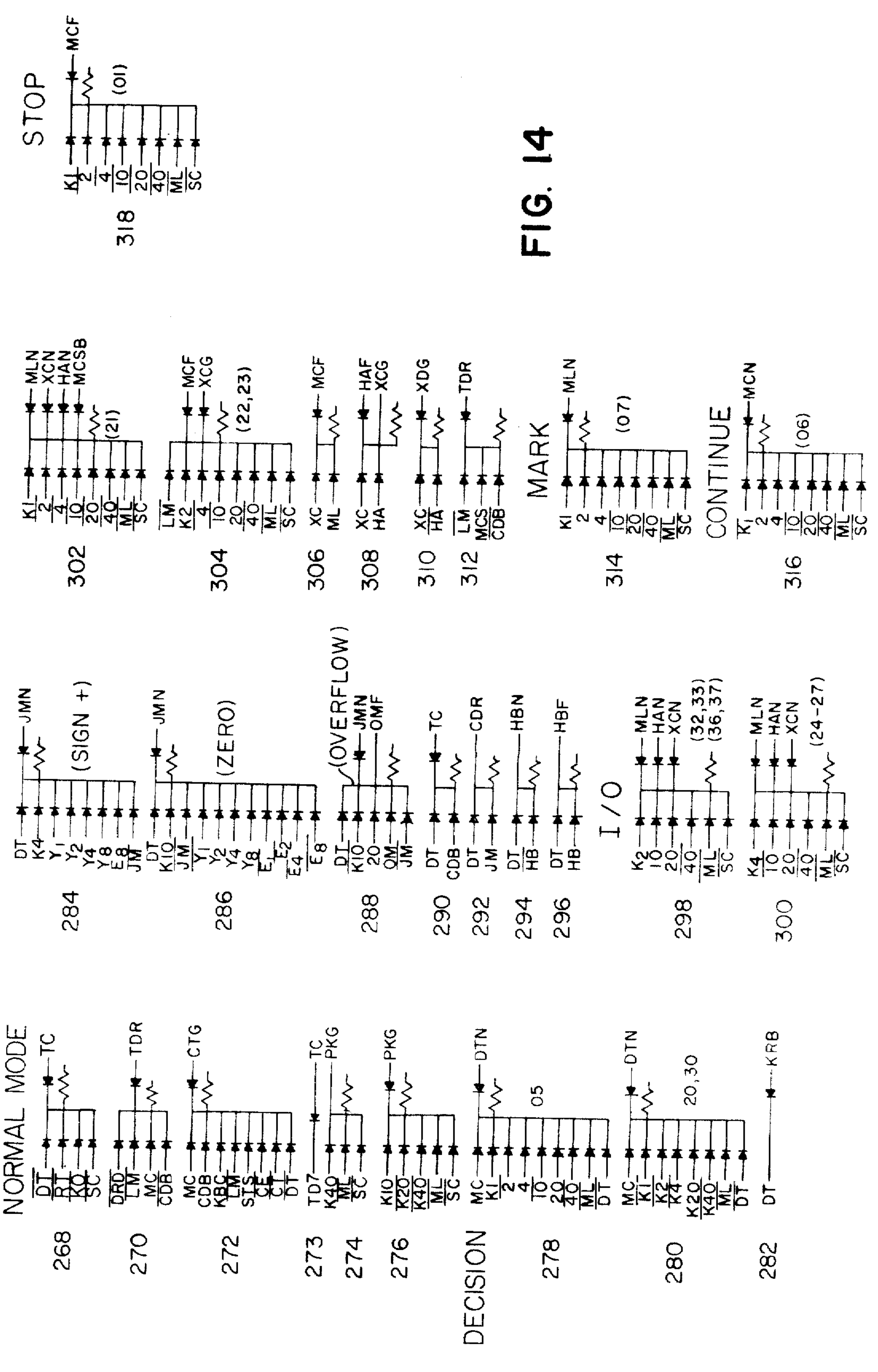

The control logic diode networks used to implement the various logical functions of the system are shown in FIG. 13 and FIG. 14. The individual networks are grouped under captions indicative of the primary operations for which they are employed.

In the following description of the system operation frequent reference will be made to the diode logic nets shown on FIGS. 13 and 14. Nets 200 through 266 are shown in FIG. 13 and nets 268 through 318 are shown on FIG. 14. For brevity, a reference such as "see FIG. 13, logic net 200" will be abbreviated as "(200)."

To initiate normal mode operation the LEARN-RUN switch 78 must be set to RUN and the CONTINUE key 84 must be actuated. If the AUTO-STEP switch 80 is set to AUTO, the tape is advanced and codes from the tape are sensed successively until a stop code "01" is encountered, at which point the read operation ceases. Alternatively, if the AUTO-STEP switch is set to STEP, the STEP key may be actuated after the CONTINUE key, causing a single code only to be sensed (single-step mode). The code thus sensed is retained in the CD shift register and may be displayed at display 34 by actuation of the DISPLAY PROGRAM switch 93. (The next operation of the STEP key causes the code to be advanced into the K register and brings the following code on the tape into the CD shift register.)

When the CONTINUE key is actuated, the continue code "06" is loaded into the K register. This causes the MC flip-flop to be set at TD5 316. Because CDB is not yet loaded with the leading framing bit CDB is present and TDR is turned on causing the tape to be driven (270). A full frame is read from the tape into the CD shift register and when CDB is set by the leading framing bit, CTG is asserted 272. The YEP pulse from the calculator display scan then produces CTP, transferring the contents of the CD shift register into K and clearing CD. The loading of K initiates TC and turns on the clock 268. If the code loaded into K is a stop code "01," MCF is asserted 318 and TD5 resets MC, turning off TDR 270 and terminating the tape drive. If the code in K is one of the codes that is to be sent to the calculator a PKG signal is produced 274, 276, and the contents of K are gated out to the calculator at TD5. The K register is reset at TD7. Note that the nets used to test for conditions dependent upon the state of K (e.g. 318, 274, 276) are all disabled by the set of the ML flip-flop. This flip-flop is set on the first code of dual-code commands such as "Mark X" or "Search X" to prevent the second ("X") code of the command from being falsely interpreted as an instruction code. This permits the second code to be used freely without restrictions and to be chosen even as a value duplicating some instruction. For example, "07-07" would be interpreted as "-Mark 7" rather than as "Mark Mark."

As soon as CD is transferred into K and cleared, CDB is again asserted, TDR appears, and the next code is read from tape into CD. The assertion of TDR 270 is interrupted only during the brief interval between the time when CDB is loaded with the lead framing bit of an incoming code and the time when the contents of CD are transferred out into K. This interval is not sufficient to permit the tape drive clutch to be disengaged; thus the read operation continues without interruption until a stop code is sensed.

When single-step operation is employed (AUTO-STEP switch 80 set to STEP) STS is not asserted until the STEP key 82 is actuated. Consequently CTG 272 is not generated automatically when the first code is loaded into CD, but is only generated when the STEP key is actuated. The first code read from the tape remains in CD and the TDR 270 is turned off, stopping the tape drive until the program is stepped. At each actuation of the STEP key 82, the code currently read from the tape is shifted into CD, and the preceding code is advanced into K. The ERC and ERD flip-flops are held in the zero state and the LD signal is turned off whenever the LEARN-RUN Switch 78 is set to RUN 200.

Learn mode operation may be initiated only when the LEARN-RUN switch 78 is set to LEARN. There are then two ways of initiating operation. The CONTINUE key 84 may be operated (after which the operation of other keys causes the corresponding codes to be written upon the tape), or alternatively, the MARK key 96 may be operated, in which case a mark code "07" is written upon the tape and further key operations write additional codes on tape. Operation of the STOP key 94 causes a stop code "01" to be written, and also ends the learn mode operation.

Operation of the CONTINUE key 84 (316) produces an MCN signal, permitting the MC flip-flop to be set, but does not cause the continue code "06" to be written upon the tape. However, operation of the MARK key 96 produces not only an MCN signal, but also an MLN and a KCG 220. The mark code "07" in K produces a TC 268 turning on the clock. The TD5 clock sets MC, and ML, and produces a KCP pulse which transfers the contents of K into $CD_{40}$—$CD_1$ while also loading 1's into the leading and lagging framing bits CDA and CDB. (When the CONTINUE key is operated, no KCG is produced 316, so the "06" continue code is not transferred from K into the CD shift register and written upon the tape.)

The transfer of the mark code "07" into CD produces $CD_0$ thus producing a 40 msec. LD pulse which turns on the tape drive 212 and allows the tape to come up to speed before writing is begun. When the LD pulse ends, WCN and TC are turned on 216. The TD5 clock then sets the WC flip-flop. Both the clock and the tape drive remain on so long as WC remains set 210. The TD6 clock sets the WD flip-flop, thereby producing the leading edge of the first bit to be written upon the tape. The state of CDB at TD7 time determines the timing of the trailing edge of the bit. If CDB contains 0, indicating that a 0 bit is to be written, the TD7 pulse resets WD and thus produces the trailing edge of the bit. If CDB contains 1 at TD7 time, no reset of WD is allowed to occur until the following TD5 time, and a 1 bit is therefore written. The contents of CD are shifted right 218 one bit at TD4, but this shift cannot effect the bit initiated at the preceding TD6 (which is irrevocably determined by the state of CDB at TD7). This cycle repeated itself until the entire code has been shifted out of CD and written upon the tape. At that point $CD_0$ is asserted, WCN and TC are turned off 216 and the final TD5 pulse resets WC. The next code keyed into K after the mark code causes MLF to be asserted 206 permitting ML to be reset. The MC flip-flop remains set, keeping the system in learn mode until a stop code "01" is keyed in 224. The reset of MC disables the generation of KCG 22, and thus prevents further codes from being transferred into the CD shift register and written upon the tape. Six control flip-flops not used during learn mode are held in the zero state whenever the LEARN-RUN switch 78 is set to LEARN 202.

The "Mark X" instruction provides a means of addressing up to 64 specific points upon the tape ("X" may be keyed in with the SPECIAL OPERATION key 88 and the switches 90). The dual-code instruction "Search X" causes the tape to advance searching for Mark codes "07" and testing the codes immediately following each mark code until the required code "X" is detected. The following codes are then processed. Thus, the Search X instruction provides a convenient means of jumping to any of 64 subroutines, provided that the beginning of each subroutine is identified with an appropriate Mark X.

The search is started by the transfer of the "02" search code into K (this can be done either manually by operation of key 98, or by the code being read from the tape). The SCN and MLN signals are then asserted 226 and at TD5 the SC and ML flip-flops are set. The "X" code is next loaded into CD (from the tape, or manually from switches 90 and SPECIAL OPERATION key 88 via K). The assertion of CDB produces CTG 246 and CTP transfers "X" into K and clears CD. The presence of "X" in K produces MLF 206, MCF, HAN, and TC 228. At TD5, ML and MC are reset and HA is set. The set of HA in turn produces TDR, CDR, KRB, and DL 230. The keyboard is locked out by KBK while TDR is asserted (FIG. 11 and FIG. 6 at 140). The TDR starts the tape drive, CDR permits the clearing of CD after each code is read in from the tape, KRB holds the "X" code in K, and DL causes an indicator to light (FIG. 10) showing that the search is in progress. Each time CD is loaded with a new code TC is asserted, producing the necessary clock cycle 232. Each code in CD is tested 236 to determine whether it is a mark code "07" (but the ML condition assures that the second codes of dual-code commands are not permitted to produce a spurious mark indication). When a mark code is detected, HBN and MLN are asserted 236 permitting TD5 to set HB and ML. The next code is then read into CD and compared with the "X" code in K. If no coincidence is sensed, HB 238 and ML 206 are cleared at TD5, and the search proceeds to seek the next mark code. However, if the code in CD matches the "X" code in K, indicating that the correct mark has been found, a CKC comparison signal is generated, causing SCF, HAF and MCN to be asserted 240. At TD5, SC, HA, HB 238, and ML 206 are reset and MC is set, ending the search operation and returning the system to normal mode.

The Search Return X instruction provides the same capability as Search X for branching to any of 64 subroutines (each preceded by a Mark X), and in addition provides for a return to the code following the Search Return X instruction when the subroutine is completed. The end of the subroutine is indicated by a Return instruction. The return is accomplished by moving the tape loop in the normal direction of tape motion until the original Search Return X instruction is passed. (It should be noted that the tape is always driven in the same direction for all modes of operation and is never driven in a reverse direction.)

When the reflective index mark on the tape passes the detector, a PCM signal is produced causing the RC counter to be reset to zero. Each search return instruction that is subsequently encountered produces an RCG signal 252 causing the RC counter to be incremented by one. The search return is started by the transfer of the "03" search return code into K (this can be either manually by operation of key 100, or by the search return code being read from the tape). The SCN and MLN signals are then asserted 226, and at TD5 both SC and ML are set to 1. The set of SC produces an RCMG 254 which transfers the contents of RC (the "address" of the current Search Return instruction as counted from the reflective strip) into the RCM store at TD7. The K register is reset at the same TD7. The next code that is read from the tape is the "X" of the Search Return X instruction. This code is gated into K by CTG 246 just as in the Search X instruction. The system then executes the same operations as during the Search X instruction until the required Mark X is found. At that point the subroutine commencing at Mark X is carried out. At the end of the subroutine there must be an "04" return code. The transfer of the "04" code into K initiates the return sequence by causing the assertion of RTN and MCF 256. At TD5 the RT flip-flop is set, and the MC flip-flop is reset. The set of RT causes the tape drive TDR to be turned on 260 and also turns on CDR 266. Each time CD is loaded with a code from the tape a clock cycle is initiated 258. The code is tested, and if it is an "03" search return code, RCG is generated 252 and the RC counter is incremented. The assertion of RCG in turn produces HAN 260, causing HA to be set at TD5. As soon as HA is set, HAF is asserted 262 (permitting HA to be reset at TD5). At TD7 the RC counter is incremented. The contents of RC are compared with the "address" of the Search Return instruction being executed (stored in RCM). If the comparison does not match, the return operation continues until the next Search Return instruction is encountered, and the comparison is repeated. (When the reflective index mark is passed, the RC counter is reset to 0.) Before a full revolution of the tape loop, the original Search Return instruction is again encountered, and the comparison is effected, producing a CRC signal. The CRC turns on RTF and MCN 264, and at TD5 both RT and HA are reset and MC is set, permitting the system to resume normal mode operation at the code following the Search Return X instruction just executed.

There are three decision test instructions. The sign test code "05" can be written upon the tape by actuating key 104. The overflow test code "20" and the zero test code "30" must be written by use of the special operation key 88 and the switches 90.

When any of the three decision tests codes are read into K, DTN is asserted 278, 280 permitting the DT flip-flop to be set at TD5. The set of DT produces KRB 282 holding the code in K, and produces HBN 294, causing the set of HB at the following TD5. If the decision test is the sign test, then when the display scan indicates position 15 (the sign digit), data bit $E_8$ is tested to determine whether the sign is positive 284. If the sign is positive, JMN is asserted, permitting the JM flip-flop to be set at the YEP pulse. If the decision test is the zero test, the most significant digit of the calculator work register is tested (display scan position 14), and if that digit is zero, then JMN is again asserted 286. Finally, if the decision test is the overflow test, and if the OM flip-flop is set, indicating that an overflow has occurred, then JMN and OFM are asserted 288. The OM flip-flop is reset when the JM flip-flop is reset.

If the JM flip-flop is not set, then the next codes are read from tape (usually a Search X instruction). The CDB produces a TC 290 turning on the clock, HB and DT are reset by HBF 296 and the program continues normally.

However, if JM is set at YEP, then CDR is asserted 292 causing CD to be reset at each TD5 and preventing the next two codes from being read into K. The first CDB produces one clock sequence 290 which sets HB and turns on HBF 296, and the second CDB produces a second clock sequence which at TD5 resets JM, DT, and HB. The reset of JM turns off CDR and permits the codes following the two-code jump to be responded to normally.

The I/O instructions fall into two groups, two-code commands and one-code commands. The two-code commands include codes 21, 24, 25, 26, 27, 32, 33, 36, and 37. Each of these codes is followed by a second "X" code, which for example could be a more detailed address or other control code to be sent to the peripheral equipment following the first code. These commands are decoded by 298, 300, and 302, which set ML, HA, and XC at TD5. With XC and HA set, 308 causes XCG and HAF to be asserted, and during the same cycle TD7 produces the first external strobe pulse, XCP (FIG. 11). When the second ("X") code is read from the tape, at TD5 MC is reset 306 and HA is reset 308, and at TD7 the XDG signal 310 produces the second external strobe pulse XDP and resets XC (FIG. 11). Within the two-code commands, the Control command (code "21") decoded by 302, differs slightly in that the MSCB signal prevents the MCS flip-flop from being set by the reset of XC. All of the other two-code commands set MCS during the external surrender of command, and use the reset of MCS (by an RSM pulse) to set MC and return command to the program. (After a control command, reentry to the program must be effected by a continue code.)

The one-code I/O commands include only codes 22 and 23. These are decoded by 304 which turns off MC and produces XCG. The XCG signal enables TD7 to produce a single external strobe pulse XCP (FIG. 11). The MCS flip-flop is not set. Diode net 312 permits the next code to be read from the tape.

Other embodiments will occur to those skilled in the art and are within the following claims.

What we claim is:

1. An electronic calculator system comprising:

a keyboard unit having a plurality of manually actuable control elements including ten control elements for numerical values from 0 through 9 and other control elements for instruction values, logic responsive to the operation of said control elements for generating predetermined codes, each such code having the same number of digits and representing either a numerical value or an instruction value, an input register coupled to said logic for storing said predetermined codes generated by said logic, an arithmetic unit coupled to said input register and responsive to numerical or instructional value codes stored in said input register, recording means operable in two modes, a learn mode in which actuation of said control elements initiates the recording of indications representative of said codes upon a recording medium, and a normal mode in which said medium is sensed for said indications and signals responsive to said sensed indications are produced to control the operation of said calculator system, and means coupling said input register to said recording medium for transmitting a code generated by said keyboard unit to said recording medium when said recording medium is operating in said learn mode and for transmitting a code from said recording medium to said input register for processing by said arithmetic unit when said recording medium is operating in said normal mode.

2. The electronic calculator system of claim 1 wherein said recording means is a magnetic tape unit comprising a magnetic tape and means for advancing said tape in the same direction during either mode of operation.

3. The electronic calculator system of claim 2 wherein said magnetic tape is provided with an indicator adapted to be sensed by said tape unit as a reference point upon said tape.

4. The electronic calculator system of claim 3 wherein said magnetic tape is formed in a closed loop and said recording means further includes erase logic adapted to erase all indications from said tape by continuing an advance of tape and erase until said indicator has been twice sensed.

5. The electronic calculator system of claim 2 wherein said magnetic tape is rotatably mounted within a cartridge, said cartridge having an opening at which a section of said tape is exposed for recording and sensing, said cartridge adapted to be readily inserted in and removed from said tape unit, said tape unit including means for advancing said tape across said opening.

6. The electronic calculator system of claim 1 and further including means for recording said codes serially upon said recording medium, said means for recording said codes including means for recording in sequence a leading guard bit, a plurality of code bits, and a trailing guard bit.

7. The electronic calculator system of claim 6 wherein said recording means includes guard bit sensing means and further including an error detector responsive to said guard bit sensing means said error detector including timing means responsive to the interval between the sensing of said leading guard bit and the sensing of said trailing guard bit by said guard bit sensing means, said timing means generating an error indication in the event that said trailing guard bit is not sensed within a predetermined interval of the sensing of said leading guard bit.

8. The electronic calculator system of claim 2 and further including means for recording each bit of said codes upon said tape in the form of two magnetic indications separated by a variable interval, the length of said interval determining the binary value of said bit.

9. An electronic calculator system comprising:

a keyboard unit having a plurality of manually actuable control elements including ten control elements for numerical values from 0 through 9 and other control elements for instruction values, first logic responsive to the operation of said control elements for generating predetermined codes, each such code having the same number of digits and representing either a numerical value or an instruction value, said instruction values including a first set of values representing complete calculator commands without operand address components and a second set of values representing the initial code of multiple-code commands second logic means adapted to produce a signal indicative of the presence of a multiple-code command represented by one of said second set of values, third logic means responsive to said signal for conditioning said system to discriminate between initial and subsequent codes of said multiple-code commands and recording means coupled to said first logic means and operable in two modes, a learn mode in which actuation of said control elements initiates the recording of indications representative of said codes upon a recording medium, and a normal mode in which said medium is sensed for said indications and signals responsive to said sensed indications are produced to control the operation of said calculator system.

10. The electronic calculator system of claim 9 further comprising a buffer register, a shift register, and means operative during learn mode operation to initially store codes to be recorded in said buffer register, to transfer said codes from said buffer register into said shift register, and to selectively write 1 and 0 bits upon said recording medium in response to the successive contents of a predetermined stage of said shift register, said recording means further comprising means operative during normal mode operation to serially load said shift register in response to said sensed indications from said recording medium, to transfer the contents of said shift register into said buffer register, and to apply output signals determined by the contents of said buffer register to control the operation of said calculator system.

11. The electronic calculator system of claim 10 further comprising input terminal means for connecting optional peripheral equipment to said calculator system and control means for enabling said equipment to sample the contents of said buffer register and for selectively transferring program control to said peripheral equipment.

12. The electronic calculator system of claim 2, further comprising search means responsive to a first predetermined code followed by an address code for causing said magnetic tape unit to search through sequential codes upon the tape until encountering a second predetermined code followed by a corresponding address code whereby the calculator next responds to the codes on the tape following said corresponding address code.

13. The electronic calculator system of claim 2 further comprising search and return logic means responsive to a first predetermined code followed by an initial address code for causing said magnetic tape unit to search through sequential codes upon the tape until encountering a second predetermined code followed by a corresponding address code, for causing the calculator to then execute the subroutine following said corresponding address code and terminated by a third predetermined code, and for then causing the tape unit to return to the point following said initial address code.

14. The electronic calculator system of claim 13 wherein said search and return logic means comprises a counter, a store, and associated logic means adapted to reset said counter at each complete revolution of said tape loop, to increment said counter each time said first predetermined code is sensed, to transfer the contents of said encounter into said store at the commencement of said search, and to compare the contents of said counter with the contents of said store and to generate a signal indicative of the completion of said return when comparison is effected.

15. The electronic calculator system of claim 1 further comprising decision test branch logic means conditionally responsive to signals from said arithmetic unit.